(12) United States Patent
Singh et al.

(10) Patent No.: US 10,740,133 B2
(45) Date of Patent: Aug. 11, 2020

(54) AUTOMATED DATA MIGRATION OF SERVICES OF A VIRTUAL MACHINE TO CONTAINERS

(71) Applicant: Nutanix, Inc., San Jose, CA (US)

(72) Inventors: Arpit Singh, Santa Clara, CA (US); Akshay Khole, Sunnyvale, CA (US); Anand Jayaraman, Cupertino, CA (US); Arun Ramachandran, San Jose, CA (US); Mohammad Ahmad, San Jose, CA (US); Vs Kalyan Ram Chintalapati, Santa Clara, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/884,022

(22) Filed: Jan. 30, 2018

(65) Prior Publication Data
US 2019/0235900 A1   Aug. 1, 2019

(51) Int. Cl.
G06F 9/455    (2018.01)
G06F 3/06     (2006.01)
G06F 9/50     (2006.01)

(52) U.S. Cl.
CPC ........ *G06F 9/45558* (2013.01); *G06F 3/0664* (2013.01); *G06F 9/5077* (2013.01); *G06F 2009/4557* (2013.01); *G06F 2009/45562* (2013.01)

(58) Field of Classification Search
CPC .. G06F 9/45558; G06F 3/0664; G06F 9/5077; G06F 2009/45562; G06F 2009/4557
See application file for complete search history.

(56) References Cited

U.S. PATENT DOCUMENTS

| 8,453,145 B1* | 5/2013 | Naik ................... G06F 9/45558 |
| | | 718/1 |
| 8,549,518 B1 | 10/2013 | Aron et al. |
| 8,601,473 B1 | 12/2013 | Aron et al. |
| 8,850,130 B1 | 9/2014 | Aron et al. |
| 9,772,866 B1 | 9/2017 | Aron et al. |

(Continued)

OTHER PUBLICATIONS

YouTube video entitled "Containerize Windows workloads with Image2Docker Tool", uploaded on Oct 27, 2016 by "Hines et al". Retrieved from Internet: <https://youtu.be/4Nk4_XL5rgQ> (Year: 2016).*

(Continued)

*Primary Examiner* — David Yi
*Assistant Examiner* — Dustin B. Fulford
(74) *Attorney, Agent, or Firm* — Dorsey & Whitney LLP

(57) ABSTRACT

Examples described herein may include migration of data associated with a service to a container. An example method includes creating of a user virtual machine associated with a service and an associated virtual disk storing data associated with running the service, and creating a volume group and an associated storage container at a node of a computing system. The example method further includes storing a cloned version of the virtual disk into the storage container, and, in response to discovery of the cloned version of the virtual disk in the storage container, mounting the cloned version of the virtual disk on the volume group to provide access to clients running the service.

24 Claims, 10 Drawing Sheets

(56) References Cited

U.S. PATENT DOCUMENTS

| | | | | |
|---|---|---|---|---|
| 2002/0083367 A1* | 6/2002 | McBride | ............ | G06F 11/1417 714/15 |
| 2011/0184993 A1* | 7/2011 | Chawla | ............... | G06F 9/45533 707/802 |
| 2013/0262638 A1* | 10/2013 | Kumarasamy | ........ | G06F 15/177 709/221 |

OTHER PUBLICATIONS

Seshachala, Sudhi "Docker vs VMs" on DevOps.com [online] [retrieved on Jan. 3, 2020]9. Retrieved from the Internet <URL: https://devops.com/docker-vs-vms/> (Year: 2014).*

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Cano, Ignacio et al. "Curator: Self-Managing Storage for Enterprise Clusters"; University of Washington; published Mar. 2017; pp. all.

* cited by examiner

AUTOMATED DATA MIGRATION OF SERVICES OF A VIRTUAL MACHINE TO CONTAINERS

TECHNICAL FIELD

Examples described herein relate generally to distributed computing systems. Examples of virtualized systems are described. Docker tools are provided in some examples of distributed computing systems described herein to facilitate migration of data associated with a service.

BACKGROUND

A virtual machine (VM) generally refers to a software-based implementation of a machine in a virtualization environment, in which the hardware resources of a physical computer (e.g., CPU, memory, etc.) are virtualized or transformed into the underlying support for the fully functional virtual machine that can run its own operating system and applications on the underlying physical resources just like a real computer.

Virtualization generally works by inserting a thin layer of software directly on the computer hardware or on a host operating system. This layer of software contains a virtual machine monitor or "hypervisor" that allocates hardware resources dynamically and transparently. Multiple operating systems may run concurrently on a single physical computer and share hardware resources with each other. By encapsulating an entire machine, including CPU, memory, operating system, and network devices, a virtual machine may be completely compatible with most standard operating systems, applications, and device drivers. Most modern implementations allow several operating systems and applications to safely run at the same time on a single computer, with each having access to the resources it needs when it needs them.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine may not be utilized to perform useful work. This may be wasteful and inefficient if there are users on other physical machines which are currently waiting for computing resources. Virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

This disclosure describes embodiments for migration of a monolithic application that includes interlinked services in a virtual machine to micro-services. The migration process may include use of containers. Generally, a container may refer to a standalone/self-contained executable package of software that includes an entire runtime environment, including an application and dependencies, libraries, binaries, configurations files, etc. to run the application. Containers are tools that may allow many different applications to coexist on a single server without interfering or interacting with each other. The container acts as a boundary within a computer system that can control which computing resources, interfaces, other applications, etc. that are available and visible to the application. From the perspective of the application, the container may look like it is providing access to the entire computing system, even though it only actually aware of a portion of the computing system permitted to be visible and accessible by from the container. In the context of a monolithic application that includes interlinked services within a virtual machine (VM), it may be difficult to migrate the monolithic application because of the dependency on the interlinked services. One solution to support migration for these types of applications may include conversion and transfer of the data associated with one or more services of the virtual machine to containers of micro-services that are then linked to by applications running on virtual machines for starting and running the associated service.

Various embodiments of the present disclosure will be explained below in detail with reference to the accompanying drawings. The following detailed description refers to the accompanying drawings that show, by way of illustration, specific aspects and embodiments of the disclosure. The detailed description includes sufficient detail to enable those skilled in the art to practice the embodiments of the disclosure. Other embodiments may be utilized, and structural, logical and electrical changes may be made without departing from the scope of the present disclosure. The various embodiments disclosed herein are not necessary mutually exclusive, as some disclosed embodiments can be combined with one or more other disclosed embodiments to form new embodiments.

Figure 1:
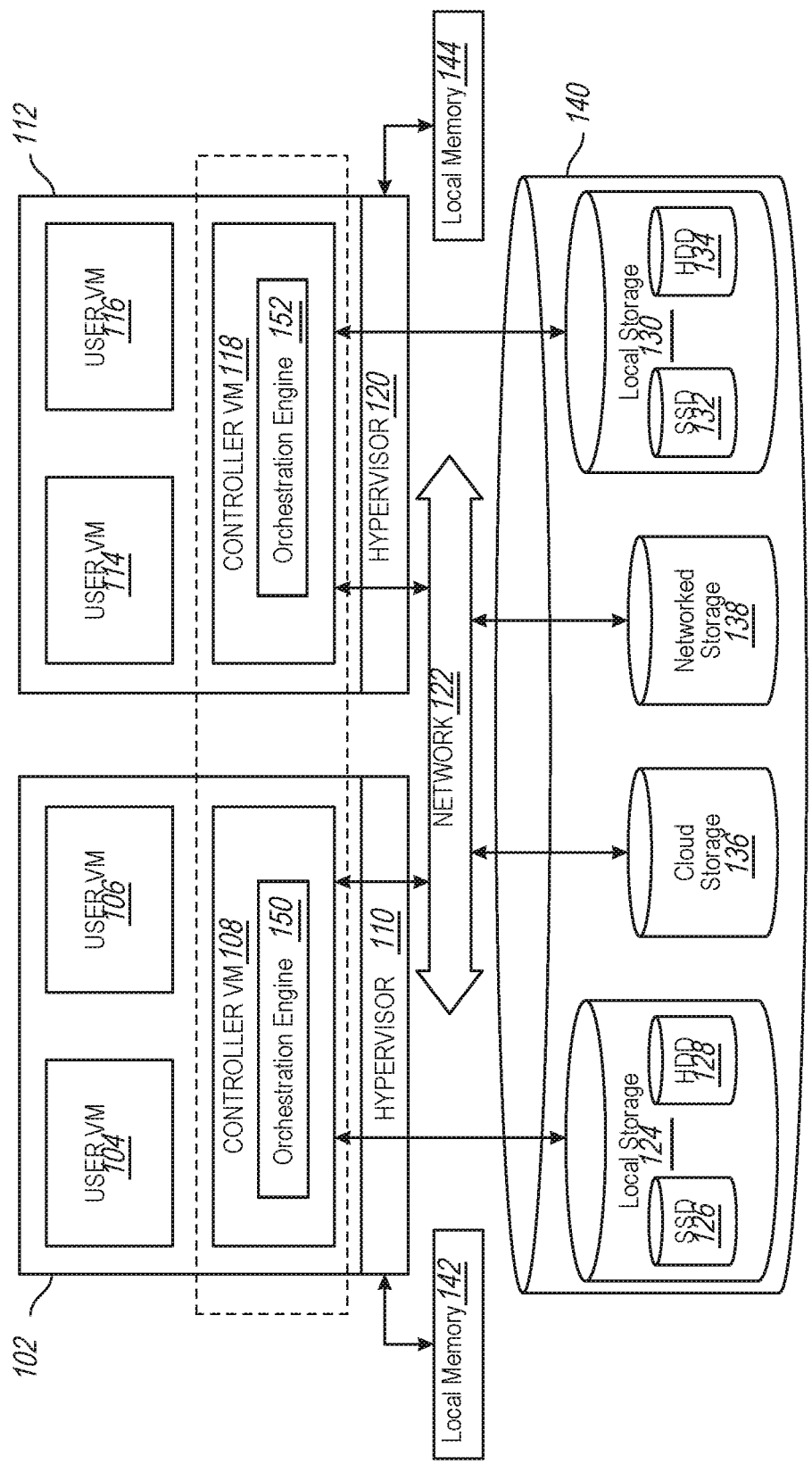
FIG. 1 is a block diagram of a distributed computing system, in accordance with an embodiment of the present disclosure.

FIG. 1 is a block diagram of a distributed computing system, in accordance with an embodiment of the present disclosure. The distributed computing system of FIG. 1 generally includes computing node 102 and computing node 112 and storage 140 connected to a network 122. The network 122 may be any type of network capable of routing data transmissions from one network device (e.g., computing node 102, computing node 112, and storage 140) to another. For example, the network 122 may be a local area network (LAN), wide area network (WAN), intranet, Internet, or a combination thereof The network 122 may be a wired network, a wireless network, or a combination thereof.

The storage 140 may include local storage 124, local storage 130, cloud storage 136, and networked storage 138. The local storage 124 may include, for example, one or more solid state drives (SSD 126) and one or more hard disk drives (HDD 128), Similarly, local storage 130 may include SSD 132. and HDD 134. Local storage 124 and local storage 130 may be directly coupled to, included in, and/or accessible by a respective computing node 102 and/or computing node 112 without communicating via the network 122. Cloud storage 136 may include one or more storage servers that may be stored remotely to the computing node 102 and/or computing node 112 and accessed via the network 122. The cloud storage 136 may generally include any type of storage device, such as HDDs SSDs, or optical drives. Networked storage 138 may include one or more storage devices coupled to and accessed via the network 122. The networked storage 138 may generally include any type of storage device, such as HDDs SSDs, or optical drives. In various embodiments, the networked storage 138 may be a storage area network (SAN). The computing node 102 is a computing device for hosting VMs in the distributed computing system of FIG. 1. The computing node 102 may be, for example, a server computer, a laptop computer, a desktop computer, a tablet computer, a smart phone, or any other type of computing device. The computing node 102 may include one or more physical computing components, such as processors.

The computing node 102 is configured to execute a hypervisor 110, a controller VM 108 and one or more user VMs, such as user VMs 104, 106. The user VMs including user VM 104 and user VM 106 are virtual machine instances executing on the computing node 102. The user VMs including user VM 104 and user VM 106 may share a virtualized pool of physical computing resources such as physical processors and storage (e.g., storage 140). The user VMs including user VM 104 and user VM 106 may each have their own operating system, such as Windows or Linux. While a certain number of user VMs are shown, generally any number may be implemented. User VMs may generally be provided to execute any number of applications and services desired by a user.

The hypervisor 110 may be any type of hypervisor. For example, the hypervisor 110 may be ESX, ESX(i), Hyper-V, KVM, or any other type of hypervisor. The hypervisor 110 manages the allocation of physical resources (such as storage 140 and physical processors) to VMs (e.g., user VM 104, user VM 106, and controller VM 108) and performs various VM related operations, such as creating new VMs and cloning existing VMs. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API.

Controller VMs (CVMs) described herein, such as the controller VM 108 and/or controller VM 118, may provide services for the user VMs in the computing node. As an example of functionality that a controller VM may provide, the controller VM 108 may provide virtualization of the storage 140. Controller VMs may provide management of the distributed computing system shown in FIG. 1. Examples of controller VMs may execute a variety of software and/or may serve the I/O operations for the hypervisor and VMs running on that node. In some examples, a SCSI controller, which may manage SSD and/or HDD devices described herein, may be directly passed to the CVM, e.g., leveraging VM-Direct Path. in the case of Hyper-V, the storage devices may be passed through to the CVM.

The computing node 112 may include user VM 114, user VM 116, a controller VM 118, and a hypervisor 120. The user VM 114, user VM 116, the controller VM 118, and the hypervisor 120 may be implemented similarly to analogous components described above with respect to the computing node 102. For example, the user VM 114 and user VM 116 may be implemented as described above with respect to the user VM 104 and user VM 106. The controller VM 118 may be implemented as described above with respect to controller VM 108. The hypervisor 120 may be implemented as described above with respect to the hypervisor 110. In the embodiment of FIG. 1, the hypervisor 120 may be a different type of hypervisor than the hypervisor 110. For example, the hypervisor 120 may be Hyper-V, while the hypervisor 110 may be ESX(i).

The controller VM 108 and controller VM 118 may communicate with one another via the network 122. By linking the controller VM 108 and controller VM 118 together via the network 122, a distributed network of computing nodes including computing node 102 and computing node 112, can be created.

Controller VMs, such as controller VM 108 and controller VM 118, may each execute a variety of services and may coordinate, for example, through communication over network 122. Services running on controller VMs may utilize an amount of local memory to support their operations. For example, services running on controller VM 108 may utilize memory in local memory 142. Services running on controller VM 118 may utilize memory in local memory 144. The local memory 142 and local memory 144 may be shared by VMs on computing node 102 and computing node 112, respectively, and the use of local memory 142 and/or local memory 144 may be controlled by hypervisor 110 and hypervisor 120, respectively. Moreover, multiple instances of the same service may be running throughout the distributed system—e.g. a same services stack may be operating on each controller VM. For example, an instance of a service may be running on controller VM 108 and a second instance of the service may be running on controller VM 118.

Generally, controller VMs described herein, such as controller VM 108 and controller VM 118 may be employed to control and manage any type of storage device, including all those shown in storage 140 of FIG. 1, including local storage 124 (e.g., SSD 126 and HDD 128), cloud storage 136, and networked storage 138. Controller VMs described herein may implement storage controller logic and may virtualize all storage hardware as one global resource pool (e.g., storage 140) that may provide reliability, availability, and performance. IP-based requests are generally used (e.g., by user VMs described herein) to send I/O requests to the controller VMs. For example, user VM 104 and user VM 106 may send storage requests to controller VM 108 using an IP request. Controller VMs described herein, such as controller VM 108, may directly implement storage and I/O optimizations within the direct data access path.

In some examples, the controller VMs may include an orchestration engine (e.g., the orchestration engine 150 and the orchestration engine 152) that facilitates migration of a data running in a VM to a respective application docker container. The orchestration engine may define a volume group that includes a virtual disk in a container. The orchestration engine may add a cloned version of the specific service virtual disk to the container and remove the default VM disk. The orchestration engine may facilitate discovery and mounting of the cloned virtual disk on the respective application docker container, which may allow a service running on the respective application docker container to access the associated service data of the cloned virtual disk. In some examples, the client may include one or more of the user VMs 104, 106, 114, or 118 and/or any respective application docker container. Controller VMs may include one or more docker tools. Orchestration services described herein may utilize the docker tools to perform the data migration associated with a service.

Note that controller VMs are provided as virtual machines utilizing hypervisors described herein—for example, the controller VM 108 is provided behind hypervisor 110. Since the controller VMs run "above" the hypervisors examples described herein may be implemented within any virtual machine architecture, since the controller VMs may be used in conjunction with generally any hypervisor from any virtualization vendor.

Virtual disks (vDisks) may be structured from the storage devices in storage 140, as described herein. A vDisk generally refers to the storage abstraction that may be exposed by a controller VM to be used by a user VM. In some examples, the vDisk may be exposed via iSCSI ("interact small computer system interface") or NFS ("network file system") and may be mounted as a virtual disk on the user VM. For example, the controller VM 108 may expose one or more vDisks of the storage 140 and may mount a vDisk on one or more user VMs, such as user VM 104 and/or user VM 106.

During operation, user VMs (e.g., user VM 104 and/or user VM 106) may provide storage input/output (I/O) requests to controller VMs (e.g., controller VM 108 and/or hypervisor 110). Accordingly, a user VM may provide an I/O request to a controller VM as an iSCSI and/or NFS request. Internet Small Computer System Interface (iSCSI) generally refers to an IP-based storage networking standard for linking data storage facilities together. By carrying SCSI commands over IP networks, iSCSI can be used to facilitate data transfers over intranets and to manage storage over any suitable type of network or the Internet. The iSCSI protocol allows iSCSI initiators to send SCSI commands to iSCSI targets at remote locations over a network. In some examples, user VMs may send I/O requests to controller VMs in the form of NFS requests. Network File System (NFS) refers to an IP-based file access standard in which NFS clients send file-based requests to NFS servers via a proxy folder (directory) called "mount point". Generally, then, examples of systems described herein may utilize an IP-based protocol (e.g., iSCSI and/or NFS) to communicate between hypervisors and controller VMs.

During operation, user VMs described herein may provide storage requests using an IP based protocol. The storage requests may designate the IP address for a controller VM from which the user VM desires I/O services. The storage request may be provided from the user VM to a virtual switch within a hypervisor to be routed to the correct destination. For examples, the user VM 104 may provide a storage request to hypervisor 110. The storage request may request I/O services from controller VM 108 and/or controller VM 118. If the request is to be intended to be handled by a controller VM in a same service node as the user VM (e.g., controller VM 108 in the same computing node as user VM 104) then the storage request may be internally routed within computing node 102 to the controller VM 108. In some examples, the storage request may be directed to a controller VM on another computing node. Accordingly, the hypervisor (e.g., hypervisor 110) may provide the storage request to a physical switch to be sent over a network (e.g., network 122) to another computing node running the requested controller VM (e.g., computing node 112 running controller VM 118).

Accordingly, controller VMs described herein may manage I/O requests between user VMs in a system and a storage pool. Controller VMs may virtualize I/O access to hardware resources within a storage pool according to examples described herein. In this manner, a separate and dedicated controller (e.g., controller VM) may be provided for each and every computing node within a virtualized computing system (e.g., a cluster of computing nodes that run hypervisor virtualization software), since each computing node may include its own controller VM. Each new computing node in the system may include a controller VM to share in the overall workload of the system to handle storage tasks. Therefore, examples described herein may be advantageously scalable, and may provide advantages over approaches that have a limited number of controllers. Consequently, examples described herein may provide a massively-parallel storage architecture that scales as and when hypervisor computing nodes are added to the system.

Figure 2A:
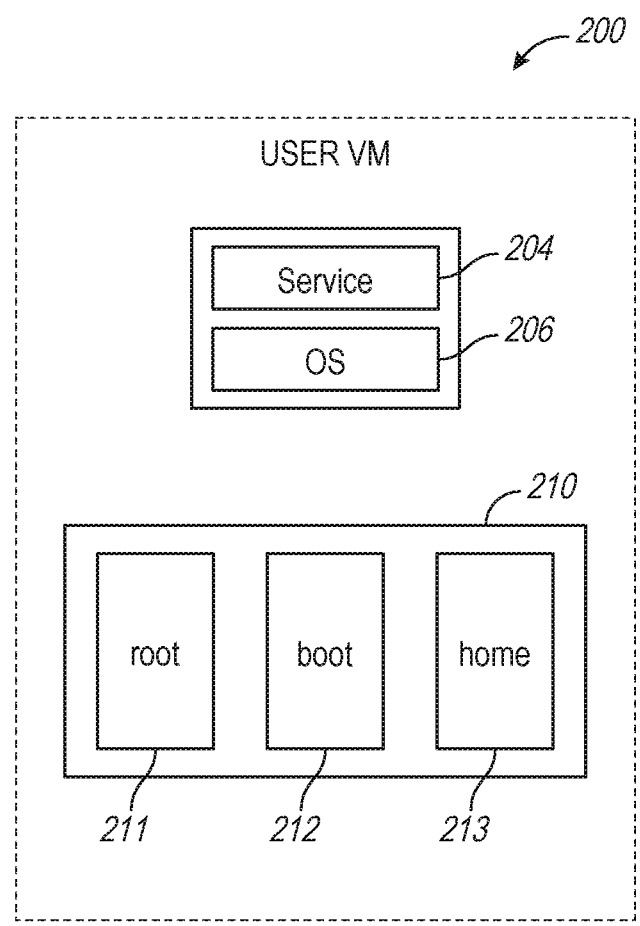
FIGS. 2A-2H illustrates a method for migration of data associated with a service running on a VM to a container in accordance with embodiments of the disclosure.

FIGS. 2A-2I depict block diagrams of steps for migration of data of a service to a respective application docker container in accordance with some embodiments of the disclosure. In FIG. 2A, a user VM 200 is created that includes the service 204, an operating system 206, and a virtual disk 210 that includes the data used by the service, separated into a root partition 211, a boot partition 212, and a home partition 213. The virtual disk 210 may be structured as a normal hardware disk from the perspective of another VM accessing the virtual disk 210. In some examples, the data associated with the service 204 may be included in the home partition 213. The user VM 200 may be similar to one or more of the user VMs 104, 106, 114, and 116 of FIG. 1. In some examples, the virtual disk 210 may include compatibility with an advanced, multi-layered unification file system (AUFS). The operating system 206 may include a version of a community enterprise operating system (CENTOS), in some examples. In some examples, the service 204 is associated with the CENTOS.

Figure 2B:
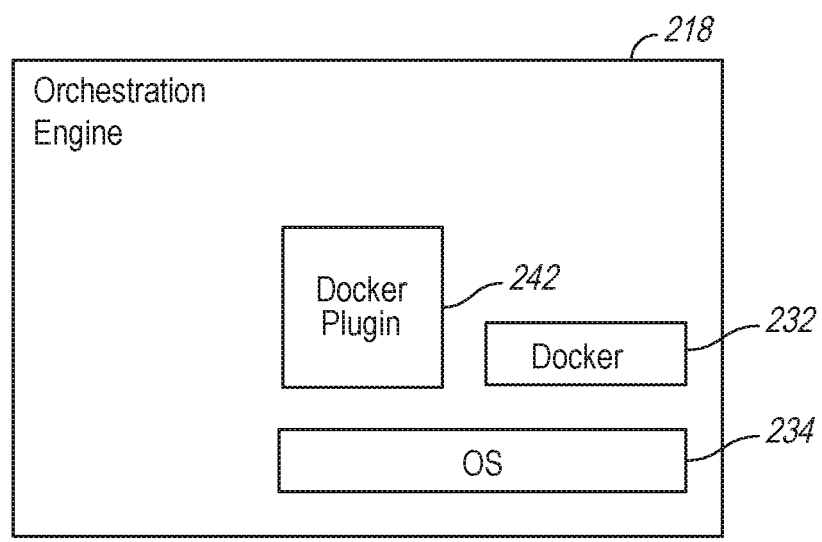

In FIG. 2B, an orchestration engine 218, such as the orchestration engine 150 or 152 of FIG. 1, executing on operating system 234 and a docker 232 over a controller VM, such as one of the controller VMs 108 and 118 of FIG. 1. The operating system 234 may include a version of the CENTOS, in some examples. The operating system 234 executing in the orchestration engine 218 may install a docker plugin 242. The docker gin 242 interfaces with the docker 232 to facilitate the access of data available to a respective application docker container instance of service.

Figure 2C:
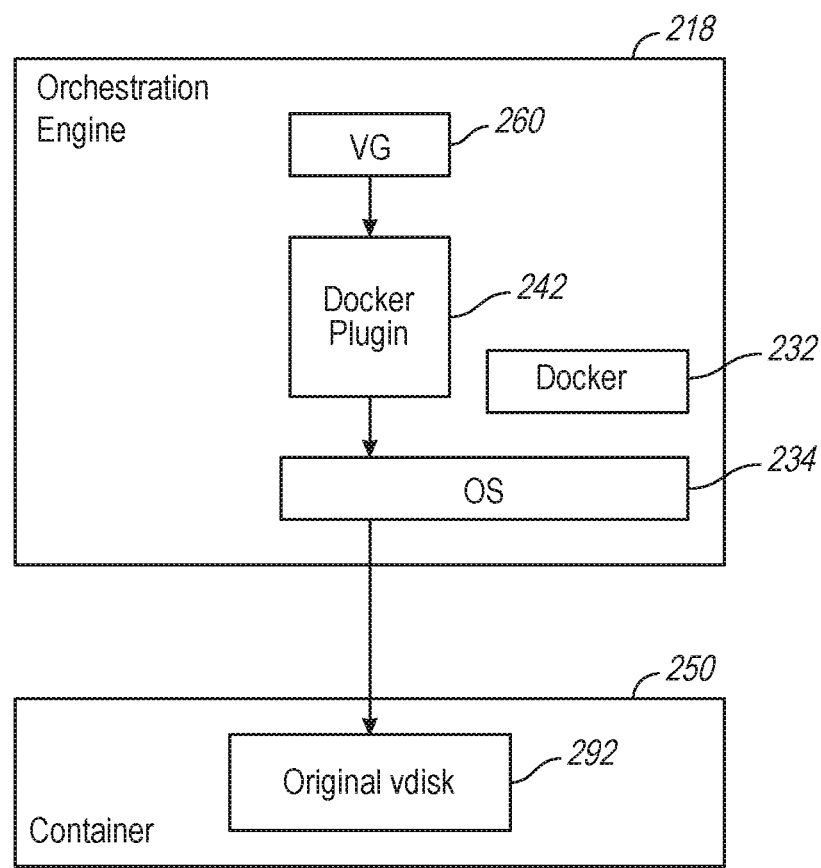

In FIG. 2C, the orchestration engine 218 creates a volume group 260. The creation of the volume group 260 includes creation of a corresponding storage container 250 that sets boundaries for the volume group 260. When a new container is created, a default virtual disk may be created to provide a discoverable hardware resource for applications running on a client (e.g., a docker container, any virtual machine, etc.) accessing the volume group to mount for data storage and retrieval. Thus, when the storage container 250 is created, an original virtual disk 292 may be stored in the storage container 250. The original virtual disk 292 may be a default virtual disk with no special data or instructions other than being compatible with software running on clients connected to the volume group 260 for access. In some examples, the original virtual disk 292 may not be created when a new container is created. The storage container 250 and the original virtual disk 292 may be stored in storage associated with a node running the orchestration engine 218, such as any of the storage 140 of FIG. 1. In some examples, the volume group 260 and storage container 250 may support an AUFS. The AUFS may prevent duplication of storage for each additional container created for other services, such as preventing shared libraries/utilities from having multiple copies on in local storage. The storage container 250 may have allocated processor and disk management resources, and may also be isolated from a network interface to prevent unauthorized access from outside a computer system. The storage container 250 may also have a process namespace for communication within the storage container 250.

Figure 2D:
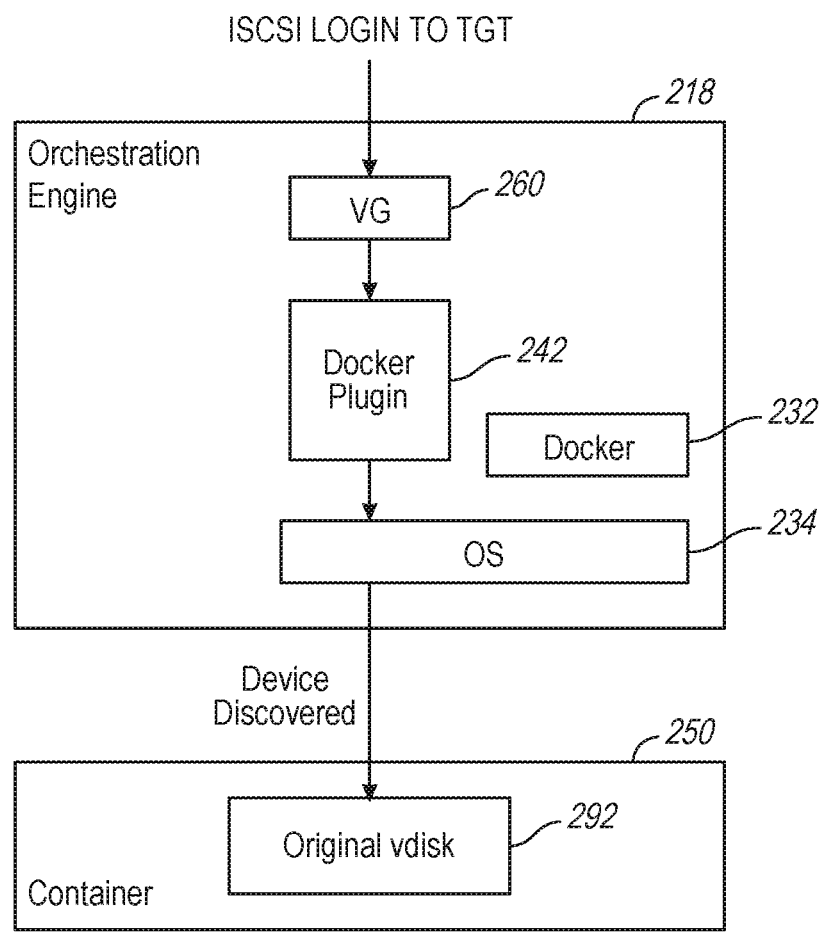

In FIG. 2D, the orchestration engine 218 accesses the volume group 260 via internet small computer systems interface (ISCSI) to discover the original virtual disk 292. The ISCSI requests may be initiated by a client configured to access the volume group 260, or by another module within the orchestration engine 218, in some examples. Other protocols may be used for the requests in other examples. In response to the requests, the orchestration engine 218 may grant access to the volume group 260 and the original virtual disk 292. The discovery process may provide validation that the container is set up properly and accessible to clients.

Figure 2E:
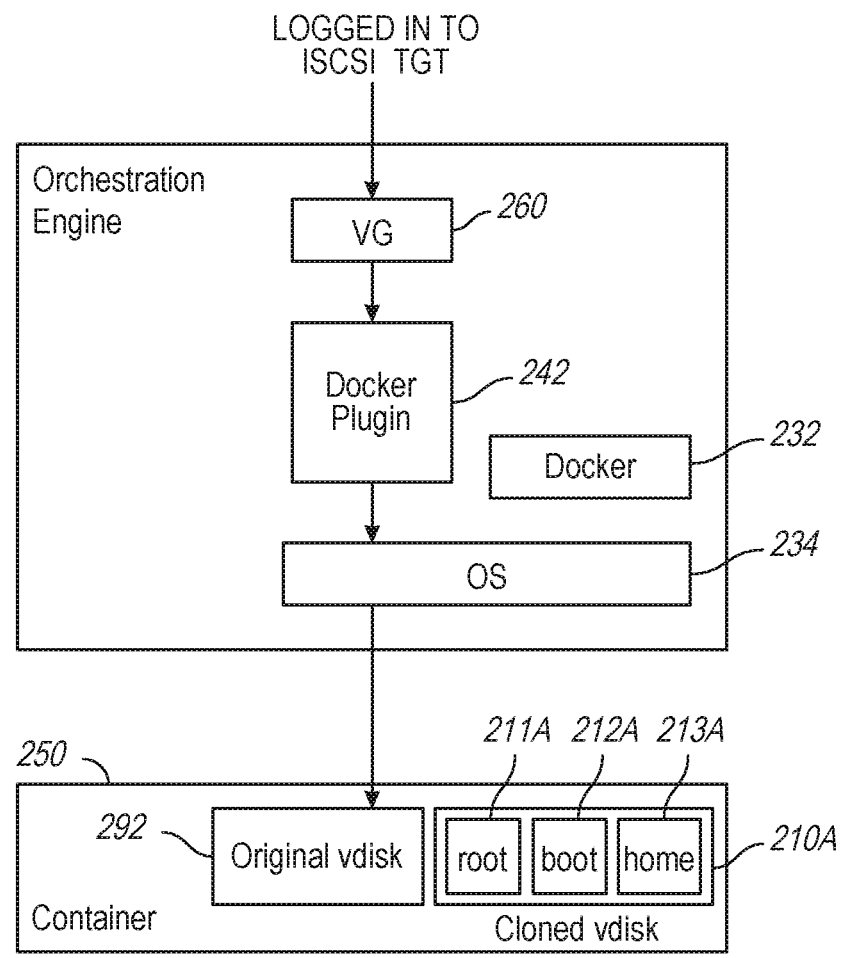

In FIG. 2E, with the client logged into the volume group 260, the orchestration engine 218, using the docker plugin 242 and/or the docker 232, may store a cloned copy of the virtual disk 210 from FIG. 2A into the storage container 250 as a cloned virtual disk 210A. The cloned virtual disk 210A may be stored in storage associated with a node running the orchestration engine 218, such as any of the storage 140 of FIG. 1. The cloned virtual disk 210A may include a cloned root partition 211A, a cloned boot partition 212A, and a cloned home partition 213A, which correspond to the root partition 211, the boot partition 212, and the cloned home partition 213, respectively. At this point, the cloned virtual disk 210A is not visible to the client logged into the volume group 260, as the cloned virtual disk 210A has yet to be discovered.

Figure 2F:
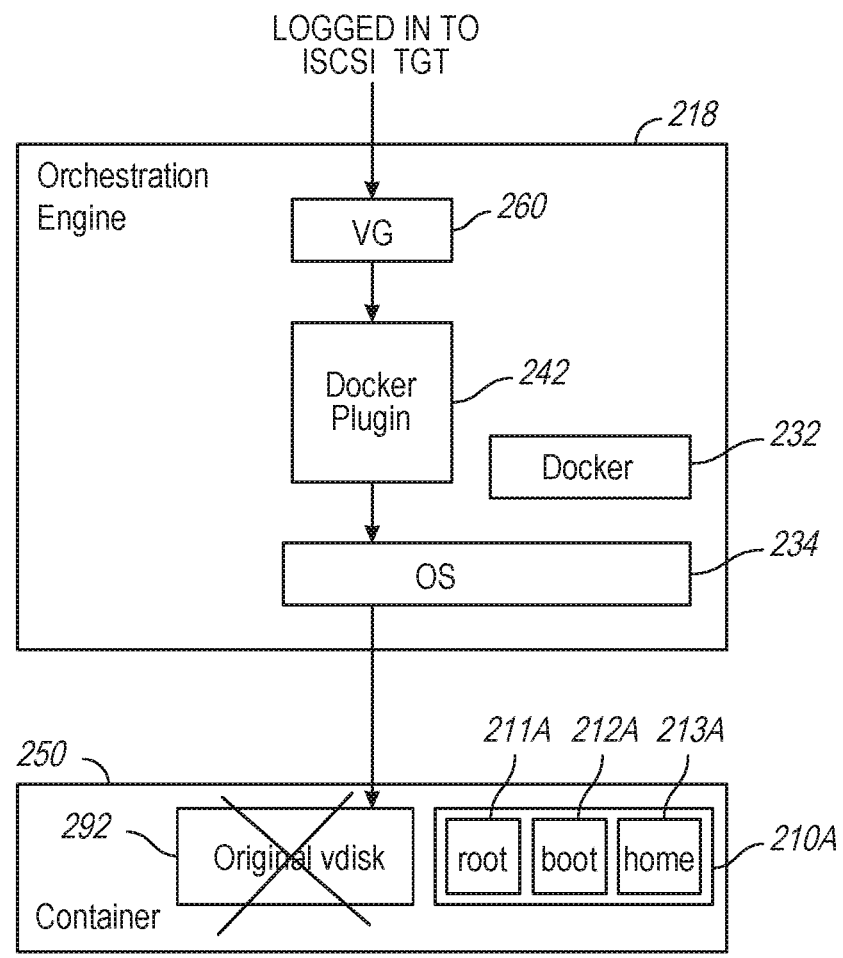
Figure 2G:
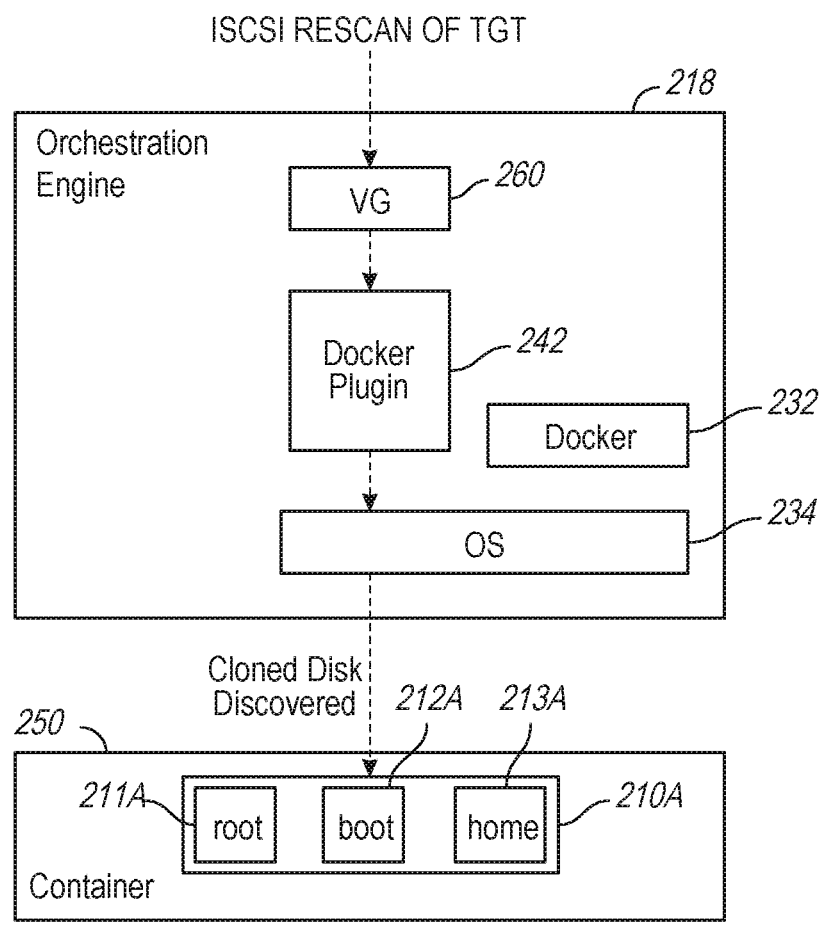

In FIG. 2F, the orchestration engine 218 deletes the original virtual disk 292 from the storage container 250. Deletion of the original virtual disk 292 may free up memory within the storage container 250, as migration of the service 204 from the user VM 200 to a respective application docker container eliminates a need for the original virtual disk 292. Removal of the original virtual disk 292 also prevents and/or reduces the instance of clients improperly discovering the original virtual disk 292 during a subsequent ISCSI discovery operation to retrieve data of the cloned virtual disk 210A in support of running the service 204 of FIG. 2A. In some examples, the original virtual disk 292 may not be present, and it therefore may not need to be deleted. Because the cloned virtual disk 210A was not present in the original scan, it is not yet visible to the client logged into the volume group 260. In FIG. 2G, after optional deletion of the original virtual disk 292, a rescan request may be received to discover virtual disks in the storage container 250, and in response to the rescan request, a rescan of the storage container 250 is performed. In response to the rescan, the cloned virtual disk 210A may be discovered. The rescan may be initiated by a client configured to access the volume group 260, or by a module within the orchestration engine 218, in some examples.

Figure 2H:
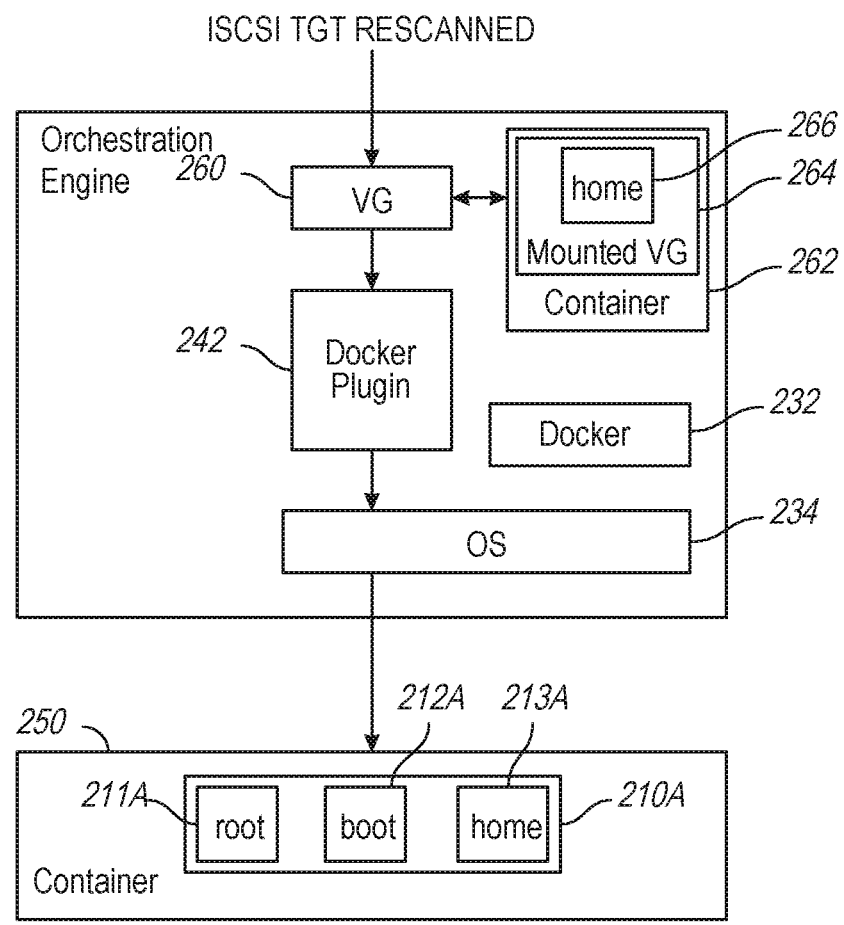

In FIG. 2H, in response to the discovery, the discovered clone virtual disk 210A is available via the volume group 260 and mounted on a VM hosting the respective application docker container 262. The discovered cloned virtual disk 210A is available on orchestration engine 218 as a directory. One or more of the directories necessary to run the service from the root partition 211A, the boot partition 212A, and the home partition 213A may then be mounted on the respective application docker container 262. After the directory mounting, the respective application docker container 262 can access the application data included in the cloned virtual disk 201A as necessary to run the service. Thus, the data is said to have migrated from the service 204 running on the user VM 200 to the respective application docker container 262.

While the method described with reference to FIGS. 2A-2H include migration of data for a single service from a single VM, it would not depart from the scope of the disclosure to use the described method for multiple services from a single VM or from multiple VMs. The service 204 may be from a user VM, or another type of VM, such as a personal computer VM. In examples where data for multiple services for a single VM are migrated, each services would have a separate container, in some examples. In examples where data for multiple services are stored in the storage container 250, each would have a separate virtual disk, in some examples.

Figure 3:
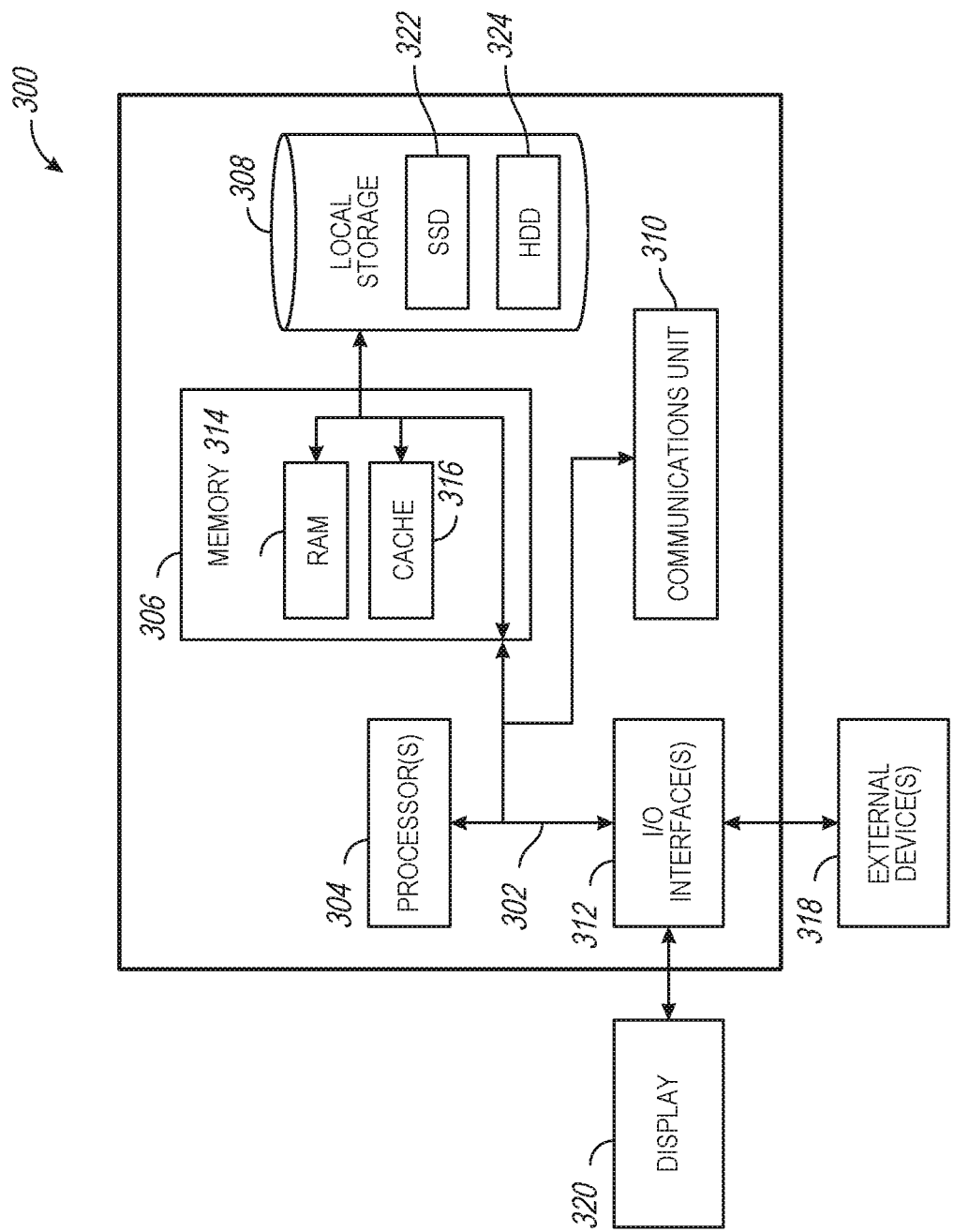
FIG. 3 depicts a block diagram of components of a computing node in accordance with an embodiment of the present disclosure.

FIG. 3 depicts a block diagram of components of a computing node 300 in accordance with an embodiment of the present disclosure. It should be appreciated that FIG. 3 provides only an illustration of one implementation and does not imply any limitations with regard to the environments in which different embodiments may be implemented. Many modifications to the depicted environment may be made. The computing node 300 may implemented as the computing node 102 and/or computing node 112. The computing node 300 may be configured to implement the method described with reference to FIGS. 2A-2H, in some examples, to migrate data associated with a service running on any VM.

The computing node 300 includes a communications fabric 302, which provides communications between one or more processor(s) 304, memory 306, local storage 308, communications unit 310, I/O interface(s) 312. The communications fabric 302 can be implemented with any architecture designed for passing data and/or control information between processors (such as microprocessors, communications and network processors, etc.), system memory, peripheral devices, and any other hardware components within a system. For example, the communications fabric 302 can be implemented with one or more buses.

The memory 306 and the local storage 308 are computer-readable storage media. In this embodiment, the memory 306 includes random access memory RAM 314 and cache 316. In general, the memory 306 can include any suitable volatile or non-volatile computer-readable storage media. The local storage 308 may be implemented as described above with respect to local storage 124 and/or local storage 130. In this embodiment, the local storage 308 includes an SSD 322 and an HDD 324, which may be implemented as described above with respect to SSD 126, SSD 132 and HDD 128, HDD 134 respectively.

Various computer instructions, programs, files, images, etc. may be stored in local storage 308 for execution by one or more of the respective processor(s) 304 via one or more memories of memory 306. In some examples, local storage 308 includes a magnetic HDD 324. Alternatively, or in addition to a magnetic hard disk drive, local storage 308 can include the SSD 322, a semiconductor storage device, a read-only memory (ROM), an erasable programmable read-only memory (EPROM), a flash memory, or any other computer-readable storage media that is capable of storing program instructions or digital information.

The media used by local storage 308 may also be removable. For example, a removable hard drive may be used for local storage 308. Other examples include optical and magnetic disks, thumb drives, and smart cards that are inserted into a drive for transfer onto another computer-readable storage medium that is also part of local storage 308.

Communications unit 310, in these examples, provides for communications with other data processing systems or devices. In these examples, communications unit 310 includes one or more network interface cards. Communications unit 310 may provide communications through the use of either or both physical and wireless communications links.

I/O interface(s) 312 allows for input and output of data with other devices that may be connected to computing node 300. For example, I/O interface(s) 312 may provide a connection to external device(s) 318 such as a keyboard, a keypad, a touch screen, and/or some other suitable input device. External device(s) 318 can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 308 via I/O interface(s) 312. I/O interface (s) 312 also connect to a display 320.

Display 320 provides a mechanism to display data to a user and may be, for example, a computer monitor.

What is claimed is:

1. A method comprising:
   creating a virtual machine associated with a service and an associated virtual disk storing data for running the service;
   creating a volume group and an associated storage container at a controller virtual machine, wherein the controller virtual machine is configured to manage storage requests for the virtual machine;
   storing a cloned version of the virtual disk into the storage container;
   mounting the cloned version of the virtual disk on the volume group at the controller virtual machine; and
   running the service from the cloned version of the virtual disk mounted on the volume group responsive to an application running on the virtual machine.

2. The method of claim 1, wherein creating the volume group and the associated storage container at the controller virtual machine comprises placing an original virtual disk in the storage container for discovery of the storage container prior to copying of the cloned version of the virtual disk into the storage container.

3. The method of claim 2, further comprising, in response to a discovery request, facilitating discovery of the original virtual disk of the storage container.

4. The method of claim 3, further comprising, after storing the cloned version of the virtual disk into the storage container, deleting the original virtual disk from the storage container.

5. The method of claim 4, further comprising receiving a rescan request to discover virtual disks stored in the storage container.

6. The method of claim 5, wherein the discovery request and the rescan request are based on internet small computer systems interface (ISCSI) protocol.

7. The method of claim 1, wherein mounting the cloned version of the virtual disk on the volume group comprises creating an instance of a partition of the cloned version of the virtual disk on the volume group.

8. The method of claim I, wherein creation of the virtual machine associated with the service and the associated virtual disk storing data associated with running the service comprises creating the virtual disk with at least one of a root partition, a boot partition, and a home partition.

9. The method of claim 1, wherein mounting the cloned version of the virtual disk on the volume group comprises mounting one or more directories of the cloned version of the virtual disk to an application docker container accessible by the volume group.

10. The method of claim 1, wherein running the service from the cloned version of the virtual disk comprises accessing one or more directories to run the service from one or more of a root partition, a boot partition, and a home partition of the cloned version of the virtual disk.

11. Non-transitory computer readable media encoded with instructions that, when executed by the at least one processor, cause a computing node to:
    create a user virtual machine associated with a service and an associated virtual disk storing data associated with running the service,
    create a volume group and an associated storage container at a controller virtual machine, wherein the controller virtual machine is configured to manage storage requests for the user virtual machine,
    store a cloned version of the virtual disk into the storage container,
    mount the cloned version of the virtual disk on the volume group at the controller virtual machine; and
    run the service from the cloned version of the virtual disk mounted on the volume group responsive to an application running on the user virtual machine.

12. The non-transitory computer readable media of claim 11, wherein the instructions further cause the computing node to facilitate the creation of the volume group and the storage container and to copy the cloned version of the virtual disk into the storage container.

13. The non-transitory computer readable media of claim 12, wherein the instructions further cause the computing node to facilitate discovery of the cloned version of the virtual disk stored in the storage container in response to a received request.

14. The non-transitory computer readable media of claim 13, wherein the received request is based on internet small computer systems interface (ISCSI) protocol.

15. The non-transitory computer readable media of claim 11, wherein the instructions further cause the computing node to, prior to storing the cloned version of the virtual disk into the storage container, facilitate discovery of an original virtual disk stored in the storage container in response to a discovery request.

16. The non-transitory computer readable media of claim 11, wherein the instructions further cause the computing node to, after storing the cloned version of the virtual disk into the storage container, deleting the original virtual disk stored in the storage container.

17. The non-transitory computer readable media of claim 11, wherein the instructions that cause the computing node to mount the cloned version of the virtual disk on the volume group include instructions that cause the computing node to create instances of a partition of the cloned version of the virtual disk on the volume group.

18. The non-transitory computer readable media of claim 11, wherein the service is associated with an operating system running on a client.

19. The non-transitory computer readable media of claim 11, wherein the instructions further cause the computing node to run the service from the cloned version of the virtual disk by accessing one or more directories to run the service from one or more of a root partition, a boot partition, and a home partition of the cloned version of the virtual disk.

20. A computing system comprising:
a plurality of computing nodes, wherein a first computing node of the plurality of computing nodes is configured to create a virtual disk storing data associated with running a service on local storage associated with the first computing node, the first computing node is further configured to create a volume group and an associated storage container at a controller virtual machine running on the first computing node and to store a cloned version of the virtual disk into the storage container, wherein the first computing node is further configured to run the service from the cloned version of the virtual disk mounted on the volume group at the controller virtual machine responsive to an application running on a user virtual machine running on the first computing node.

21. The computing system of claim 20, wherein the first computing node is configured to run the controller virtual machine to facilitate access to data stored on the virtual disk.

22. The computing system of claim 20, wherein the first computing node comprises a plurality of clients running in virtual machines that are connected to the cloned version of the virtual disk.

23. The computing system of claim 22, wherein the first computing node is configured to store data associated with multiple services in the virtual disk and the cloned version of the virtual disk.

24. The computing system of claim 20, wherein the cloned version of the virtual disk includes cloned versions of one or more of a root partition, boot partition, and home partition of the virtual disk.

* * * * *